United States Patent [19]
Watanabe et al.

[11] Patent Number: 5,450,393
[45] Date of Patent: Sep. 12, 1995

[54] MULTIPLEX TRANSMISSION APPARATUS

[75] Inventors: Yuichi Watanabe; Kyosuke Hashimoto; Mitsunori Kato; Yusaku Himono, all of Tokyo, Japan

[73] Assignee: The Furukawa Electric Co., Ltd., Tokyo, Japan

[21] Appl. No.: 244,235

[22] PCT Filed: Sep. 17, 1993

[86] PCT No.: PCT/JP93/01338

§ 371 Date: May 19, 1994

§ 102(e) Date: May 19, 1994

[87] PCT Pub. No.: WO94/07317

PCT Pub. Date: Mar. 3, 1994

[30] Foreign Application Priority Data

Sep. 22, 1992 [JP] Japan ................................. 4-252564

[51] Int. Cl.[6] ........................................... H04L 29/14
[52] U.S. Cl. ................. 370/16.1; 370/85.12; 375/257
[58] Field of Search ............... 340/310 R, 310 CP; 371/11.1, 11.2, 48, 66, 63; 370/5, 14, 16, 85.9, 85.12; 375/36

[56] References Cited

U.S. PATENT DOCUMENTS

| | | | |
|---|---|---|---|
| 3,889,236 | 6/1975 | Herger et al. | 395/200 |
| 4,937,811 | 6/1990 | Harris | 370/5 |
| 5,200,743 | 4/1993 | St. Martin et al. | 340/310 R |
| 5,289,365 | 2/1994 | Caldwell et al. | 340/310 R |

FOREIGN PATENT DOCUMENTS

| | | |
|---|---|---|
| 49-94243 | 10/1973 | Japan . |
| 55-107361 | 8/1980 | Japan . |
| 58-6638 | 1/1983 | Japan . |
| 61-253943 | 11/1986 | Japan . |
| 62-293845 | 12/1987 | Japan . |

Primary Examiner—Benedict V. Safourek
Attorney, Agent, or Firm—Frishauf, Holtz, Goodman, Langer & Chick

[57] ABSTRACT

A terminal node (40); which includes a first bias unit (41) for biasing a first transmission line (10), out of two common transmission lines (10, 11), to a power supply potential, a second bias unit (42) for biasing a second transmission line (11) to the ground potential, and a communication control unit (43) for controlling data transmission. Another terminal node (50), which includes a communication control unit (51) is also provided. Connecting terminals (44 to 47, 52 to 55) are provided which connect the bias units (41, 42) and the communication control units (43, 51) of the terminal nodes (40, 50) to the transmission lines (10, 11) at two points for each line, and the terminal nodes (40, 50) are daisy-chain-connected to the transmission lines (10, 11) by means of the connecting terminals.

20 Claims, 9 Drawing Sheets

MULTIPLEX TRANSMISSION APPARATUS

TECHNICAL FIELD

This invention relates to a multiplex transmission apparatus in which a plurality of terminal nodes are connected to two or more common transmission lines.

BACKGROUND OF THE INVENTION

Conventionally, in a multiplex transmission apparatus, a plurality of first terminal nodes, each including a first bias unit for biasing a first transmission line, out of two transmission lines (main lines), to the supply-side potential, a second bias unit for biasing a second transmission line to the ground-side potential, and a communication control unit for data communication control, and a plurality of second terminal nodes, each including a communication control unit for data communication control, are connected to one another by means of the common transmission lines. In each first terminal node, the first bias unit and the communication control unit are connected to the first transmission line by means of a first branch line, while the second bias unit and the communication control unit are connected to the second transmission line by means of a second branch line. In each second terminal node, on the other hand, the communication control unit is connected to the first and second transmission lines by means of two branch lines, individually. The first and second terminal nodes transfer data between them through these common transmission lines.

In the multiplex transmission apparatus arranged in this manner, each terminal node is connected to each transmission line by means of a joint connector and two branch lines. If one of the branch lines is cut and when data are to be transmitted and received by that terminal node which is connected to the transmission line by means of the cut branch line, the communication control unit of this terminal node is disconnected from one of the transmission lines. Therefore, the data transmission is one-way transmission by means of the uncut branch line.

If the terminal node connected to the cut branch line is the first terminal node, and when data are to be transmitted and received by means of this first terminal node, in this multiplex transmission apparatus, however, the data transmission is one-way transmission as in the aforesaid case, and bias failure is caused, resulting in a double fault. In the multiplex transmission apparatus, moreover, the transmission lines and the terminal nodes are connected to one another by means of the joint connectors and the branch lines, as mentioned before. In this multiplex transmission apparatus, therefore, there are many junctions (usually eight junctions in this connection) between the transmission lines and the terminal nodes, the first terminal node including the bias units and the second terminal node including no bias units have different impedance characteristics, and reflected waves are generated in the transmission waveform. According to the prior art example described above, the transmission lines are connected in a loop form. These problems are not, however, limited to this arrangement, and the case of bus-form connection of the transmission lines involves the same problems.

SUMMARY OF THE INVENTION

An object of this invention is to provide a multiplex transmission apparatus in which a double fault can be prevented even in case of cutting of a transmission line, so that the reliability of data transmission can be improved.

Another object of this invention is to provide a multiplex transmission apparatus capable of preventing reflected waves from being generated in the transmission waveform.

Still another object of this invention is to provide a multiplex transmission apparatus capable of lowering the level of noises emitted from the multiplex transmission apparatus.

In order to achieve the above objects, an apparatus according to this invention comprises at least two common transmission lines, a plurality of first terminal nodes, each including first biasing means for biasing one of the transmission lines to the supply-side potential, second biasing means for biasing the other of the transmission lines to the ground side, communication control means for controlling data transmission, and connecting means for connecting the biasing means and the communication control means to the transmission lines at least at two points for each line, and a plurality of second terminal nodes each including the communication control means.

Preferably, the connecting means connects the first terminal node to the individual transmission lines by daisy-chain connection.

According to this invention, moreover, power lines are arranged along the transmission lines.

According to this invention, as described above, the biasing means and the communication control means of the first terminal node are connected to the transmission lines at two or more points by means of the connecting means, without using any branch lines, whereby multiplex transmission of data to and from the other terminal node is executed. Even in case of a fault such that one of the transmission lines is cut, therefore, there is no possibility of a double fault involving one-way transmission and bias failure, since the transmission lines are connected to the biasing means and the communication control means at a plurality of points. Since the power lines are arranged along the transmission lines, moreover, the level of noises emitted from the multiplex transmission apparatus can be lowered.

BRIEF DESCRIPTION OF THE DRAWINGS

The drawings show embodiments of this invention, in which.

DETAILED DESCRIPTION

Embodiments of this invention will now be described with reference to the drawings of FIGS. 1 to 12. In a multiplex transmission apparatus which embodies this invention, transmission lines may be connected, for example, in a loop form or bus form, and substantially the same components of the apparatus are used for the loop and bus forms. In connection with this embodiment, therefore, the loop type will be described by way of representation.

Figure 1:
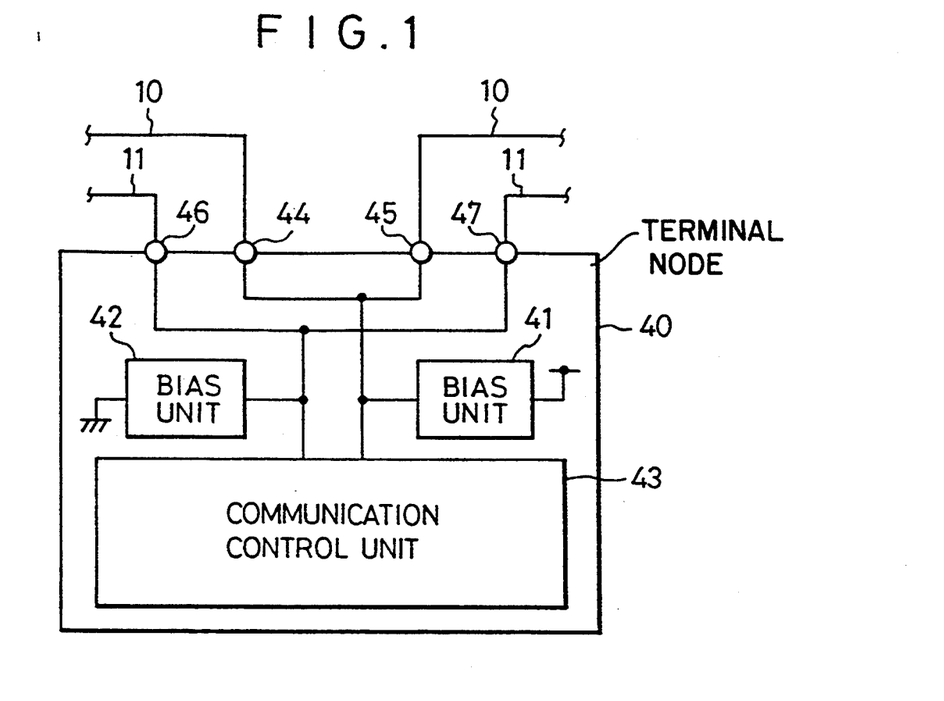
FIG. 1 is a block diagram showing a first embodiment of an arrangement of a terminal node according to this invention.

Referring to FIG. 1, a terminal node 40 including bias units comprises a first bias unit 41, a second bias unit 42, a communication control unit 43, and connecting terminals 44 to 47.

The first bias unit 41 is connected to a first transmission line 10, and biases this first transmission line 10 to the supply-side potential. The second bias unit 42 is connected to a second transmission line 11, and biases this second transmission line 11 to the ground-side potential.

The communication control unit 43 is connected to the transmission lines 10 and 11, and modifies the respective voltages of the transmission lines 10 and 11 depending on the mode, dominant or passive, thereby effecting data communication control.

The connecting terminals 44 and 45 serve to connect the first bias unit 41 and the communication control unit 43 to the first transmission line 10 at two points. The connecting terminals 46 and 47 serve to connect the second bias unit 42 and the communication control unit 43 to the second transmission line 11 at two points. Moreover, the transmission lines 10 and 11 and the terminal node 40 are connected by daisy-chain connection.

Figure 2:
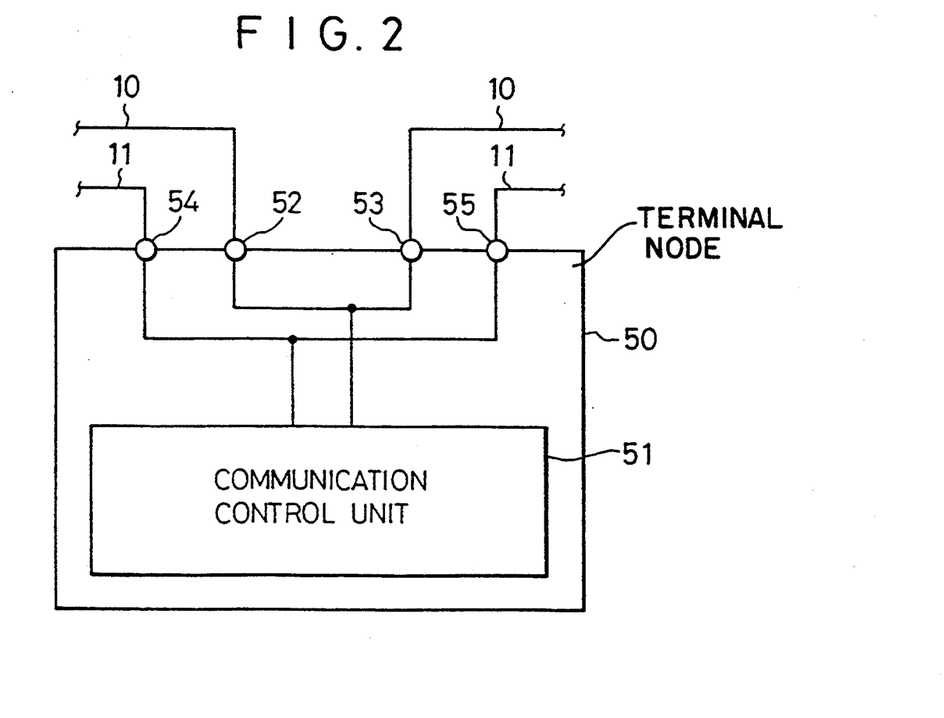
FIG. 2 is a block diagram showing a second embodiment of the arrangement of the terminal node according to this invention.

Referring to FIG. 2, a terminal node 50 including no bias units comprises a communication control unit 51, which has the same function as the communication control unit 43 shown in FIG. 1, and connecting terminals 52 to 55.

The connecting terminals 52 and 53 serve to connect the communication control unit 51 to the first transmission line 10 at two points. The connecting terminals 54 and 55 serve to connect the communication control unit 51 to the second transmission line 11 at two points. Moreover, the transmission lines 10 and 11 and the terminal node 50 are connected by daisy-chain connection, and the transmission lines 10 and 11 are connected in a loop form each.

The connecting terminals shown in FIGS. 1 and 2 may be arranged at two or more points on each transmission line.

Figure 3:
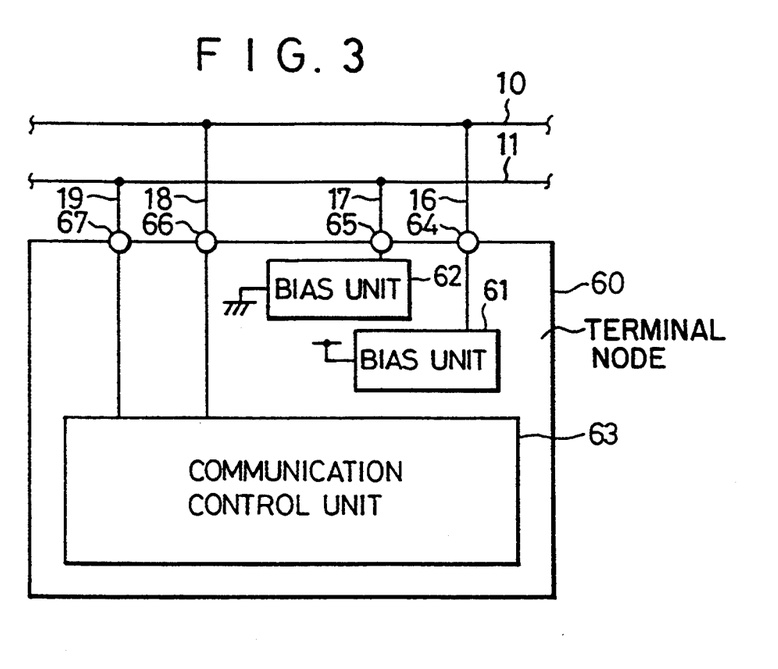
FIG. 3 is a block diagram showing a third embodiment of the arrangement of the terminal node according to this invention.

The terminal node including the bias units may be arranged, for example, in the manner shown in FIG. 3, besides being arranged in the manner shown in FIG. 1. In a terminal node 60 of FIG. 3, connecting terminals 64 to 67 are arranged at one or more points which connect a first bias unit 61, a Second bias unit 62, and a communication control unit 63 for data communication control independently to the transmission lines 10 and 11 by means of branch lines 16 to 19. In this third embodiment, the first bias unit 61 biases the first transmission line 10 to the supply-side potential, while the second bias unit 62 biases the second transmission line 11 to the ground-side potential. Also, the units and the connecting terminals in this terminal node can be wired by means of, for example, a printed circuit board or the like.

Figure 4:
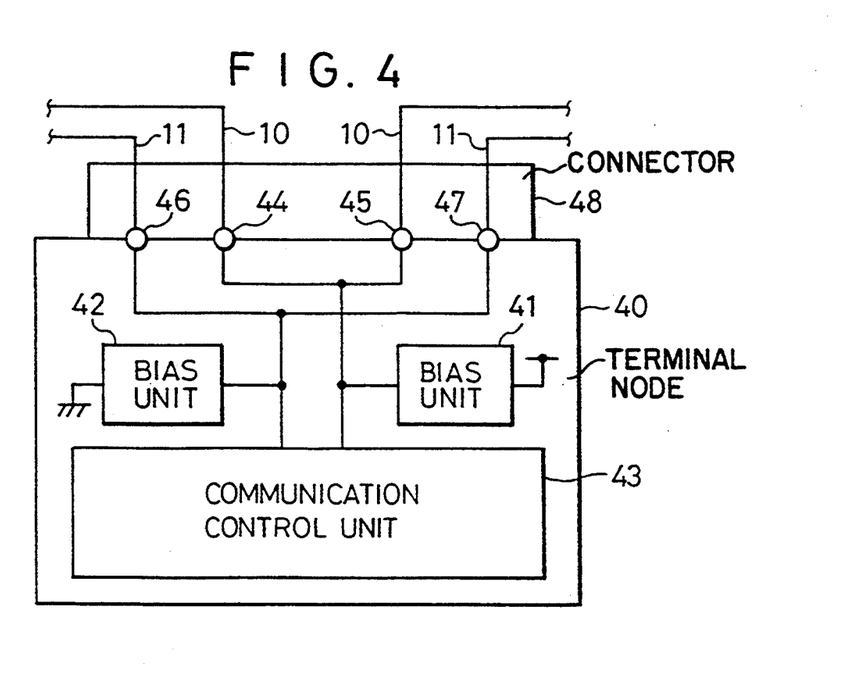
FIG. 4 is a block diagram showing a fourth embodiment of the arrangement of the terminal node according to this invention.
Figure 5:
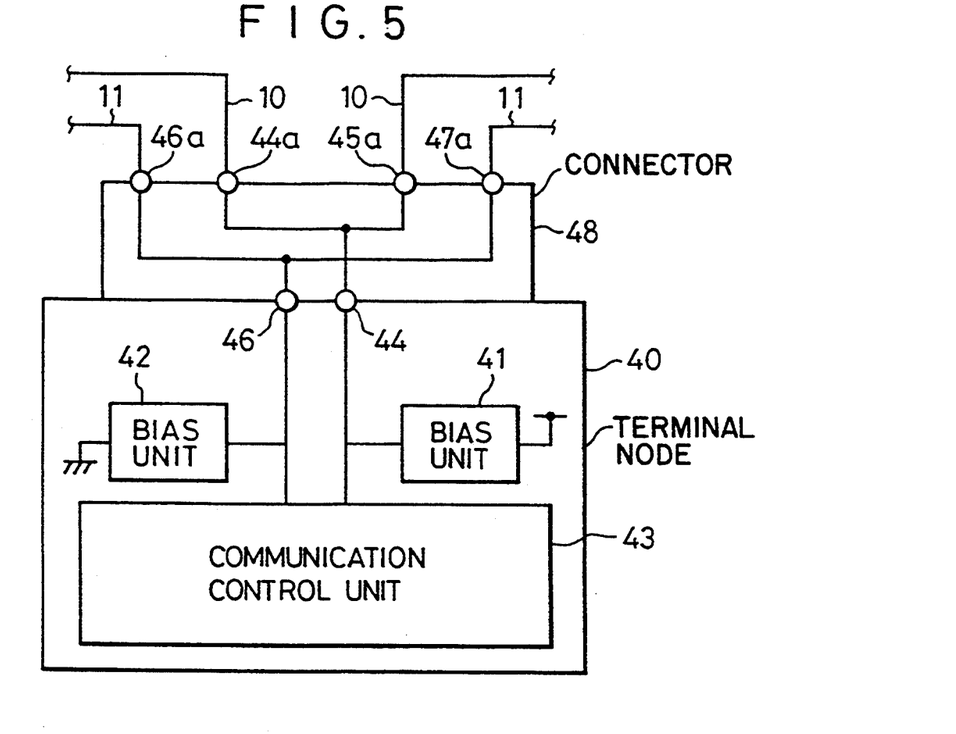
FIG. 5 is a block diagram showing a fifth embodiment of the arrangement of the terminal node according to this invention.
Figure 6:
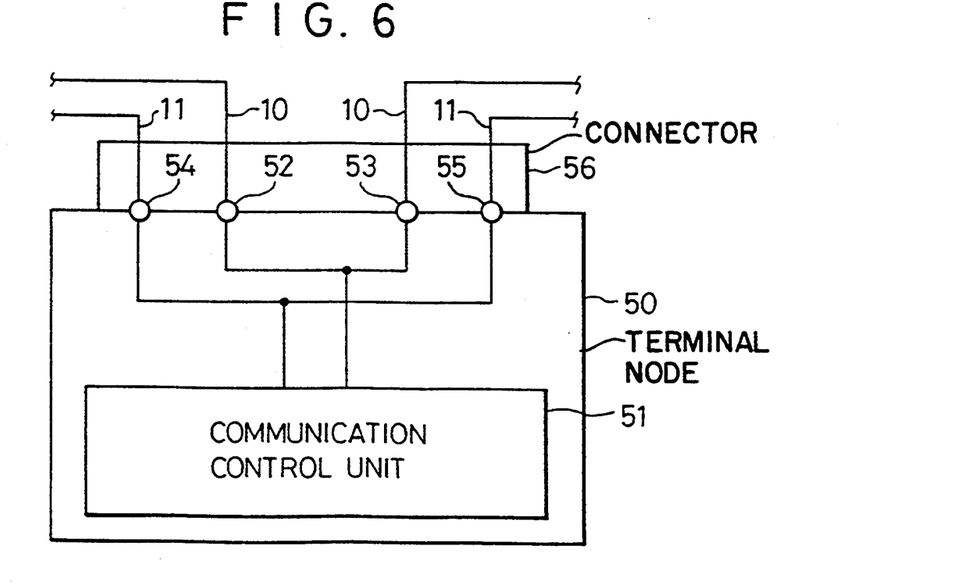
FIG. 6 is a block diagram showing a sixth embodiment of the arrangement of the terminal node according to this invention.
Figure 7:
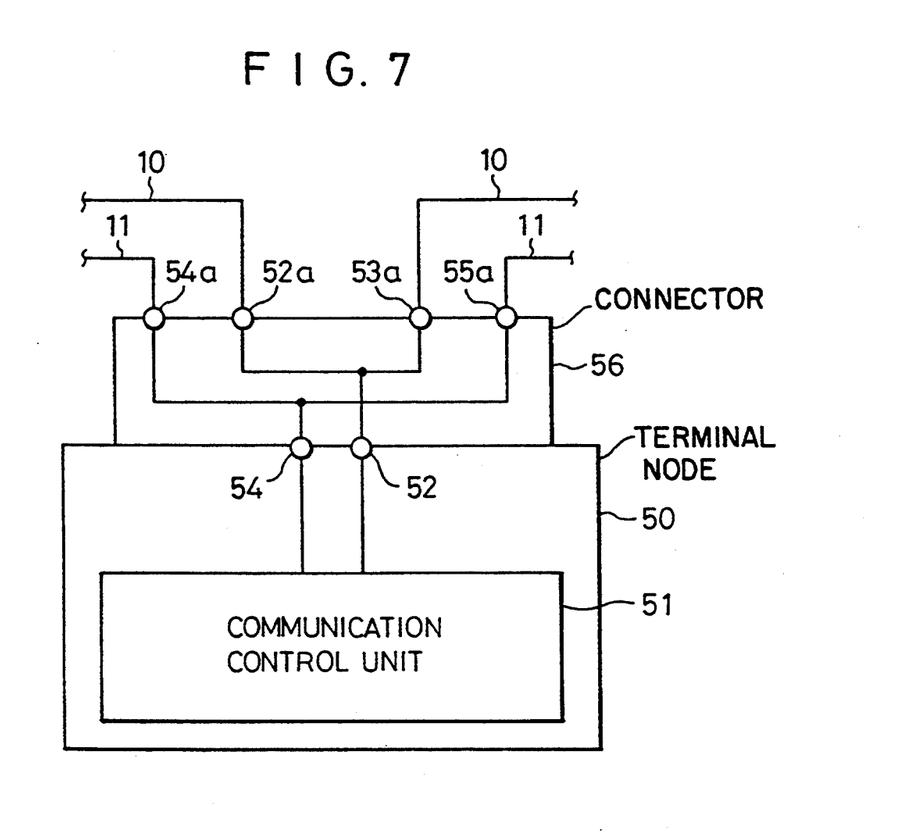
FIG. 7 is a block diagram showing a seventh embodiment of the arrangement of the terminal node according to this invention.

Moreover, FIGS. 4 and 5 are block diagrams showing alternative embodiments of the terminal node 40, and FIGS. 6 and 7 are block diagrams showing alternative embodiments of the terminal node 50.

Referring to FIGS. 4 and 6, among these drawings, there are shown fourth and sixth embodiments in which the transmission lines 10 and 11 and the terminal nodes 40 and 50 are daisy-chain-connected in the terminal nodes 40 and 50 by means of connectors 48 and 56, respectively.

Referring to FIGS. 5 and 7, moreover, there are shown fifth and seventh embodiments in which the terminal nodes 40 and 50 are connected by means of four connecting terminals 44a to 47a or 52a to 55a, and the transmission lines 10 and 11 and the terminal nodes 40 and 50 are daisy-chain-connected in the connectors 48 and 56, respectively. Thus, in these embodiments, the transmission lines 10 and 11 can be prevented from being simultaneously broken even when the connectors 48 and 56 are disengaged from the terminal nodes 40 and 50, respectively.

Figure 8:
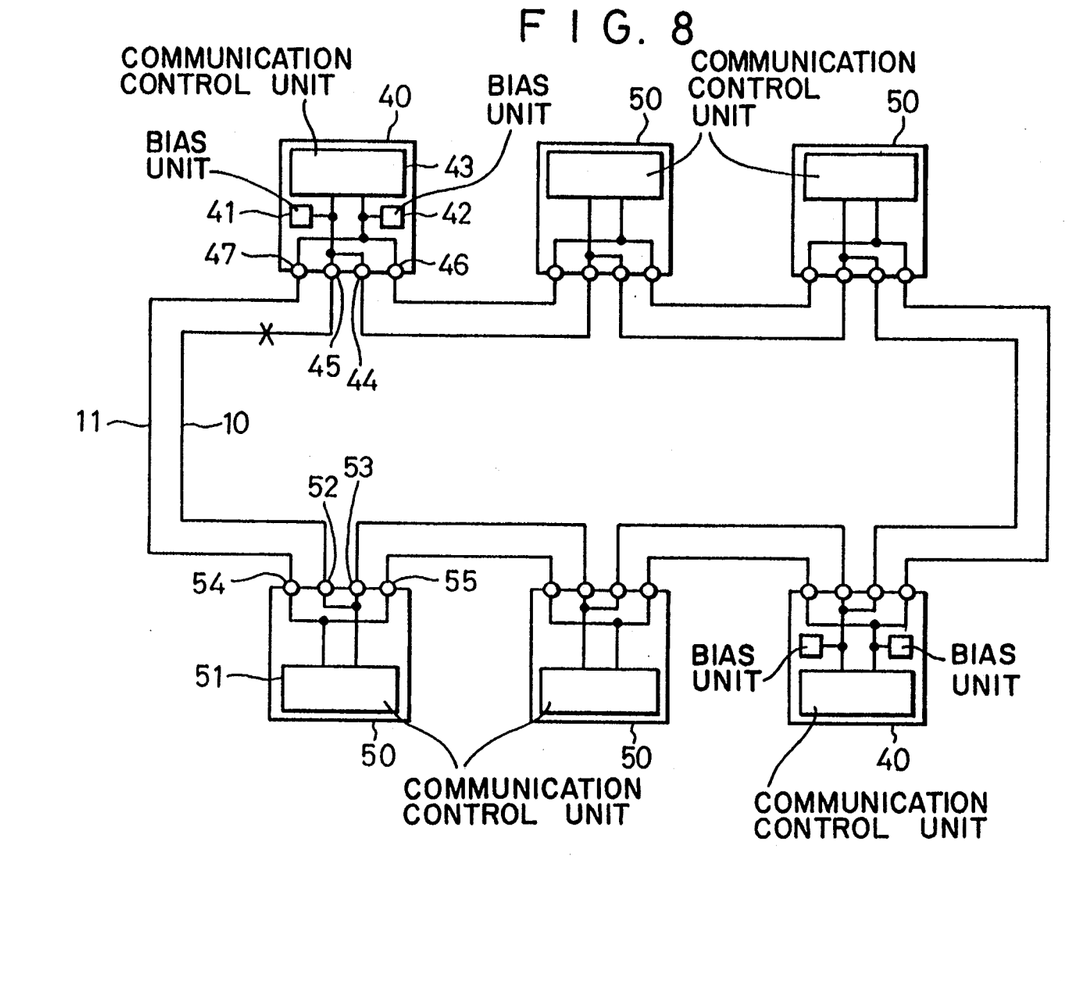
FIG. 8 is a block diagram showing a first embodiment of an arrangement of a multiplex transmission apparatus according to this invention.
Figure 9:
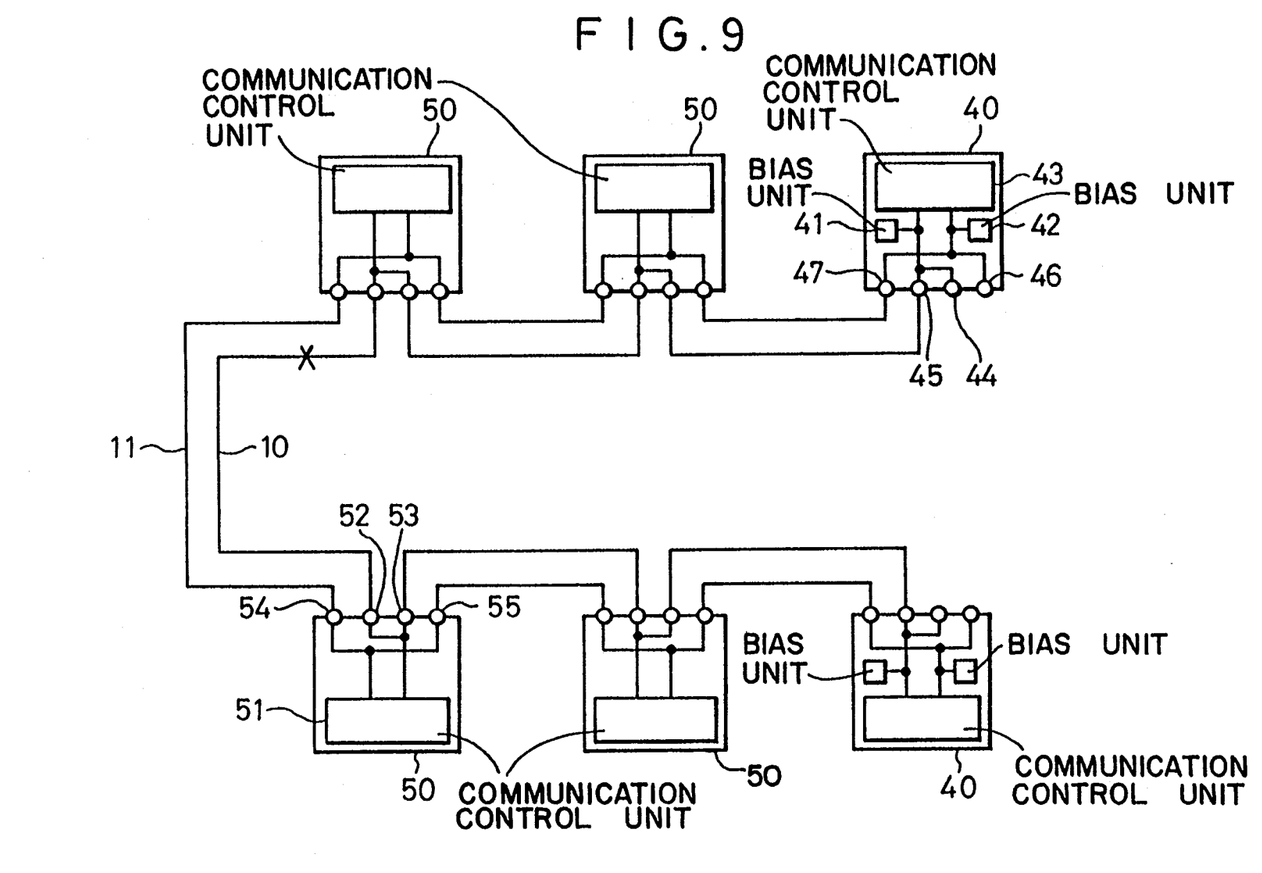
FIG. 9 is a block diagram showing a second embodiment of the arrangement of the multiplex transmission apparatus according to this invention.

FIG. 8 shows a first embodiment of an arrangement of the multiplex transmission apparatus according to this invention.

Referring to FIG. 8, each terminal node 40 (see FIG. 1) including the bias units and each terminal node 50 (see FIG. 2) including no bias units are daisy-chain-connected individually to the two transmission lines 10 and 11. More specifically, in each terminal node 40 including the bias units, both of the bias units 41 and 42 and the communication control unit 43 are daisy-chain-connected to the transmission lines 10 and 11, at two points for each line, by means of the connecting terminals 44 to 47. In each terminal node 50 including no bias units, moreover, the communication control unit 51 is daisy-chain-connected to the transmission lines 10 and 11, at two points for each line, by means of the connecting terminal 52 to 55.

Thus, according to this first embodiment, the first bias unit 41 of the terminal node 40 including the bias units, having no branch lines, is connected to the transmission line 10 by means of the connecting terminal 44 even in case of a fault such that one of the transmission lines near the terminal node 40 is broken, e.g., in the position marked with a cross on the transmission line 10 shown in FIG. 8. In this embodiment, therefore, there is no possibility of bias failure or one-way transmission, and the terminal node 40 can enjoy satisfactory data transfer to and from the other terminal nodes in the apparatus. According to this embodiment, moreover, the transmission lines have a loop form arranged by daisy-chain connection, and the branch lines are reduced, so that reflected waves cannot be easily generated in the transmission waveform. In this embodiment, furthermore, the transmission lines and the terminal nodes are connected directly to one another by the daisy-chain connection method without the use of joint connectors. Accordingly, there are four junctions, which are fewer than in the conventional connecting method (eight junctions).

In the case where the transmission lines are connected in a loop, as in the first embodiment, a double fault involving simultaneous occurrence of one-way transmission and bias failure can be prevented if one of the transmission lines is broken, even though only one terminal node 40 including the bias units exists in the multiplex transmission apparatus. In connecting the transmission lines in a bus form, moreover, it is necessary to provide two or more terminal nodes 40 including the bias units in the multiplex transmission apparatus so that the terminal nodes 40 are located individually at the opposite ends of the transmission lines, as in a second embodiment shown in FIG. 9, in order to prevent the occurrence of a double fault in case of breaking of the transmission line. This applies to all the cases where the following loop-form multiplex transmission apparatuses according to third to fifth embodiments are adapted to the bus form. Thus, the double fault involving simultaneous occurrence of one-way transmission and bias failure can be prevented despite the occurrence of disconnection at any points on the transmission lines.

The terminal nodes including no bias units may be connected by any other method than the daisy-chain connection, and may, for example, be connected by a conventional connecting method using branch lines.

Figure 10:
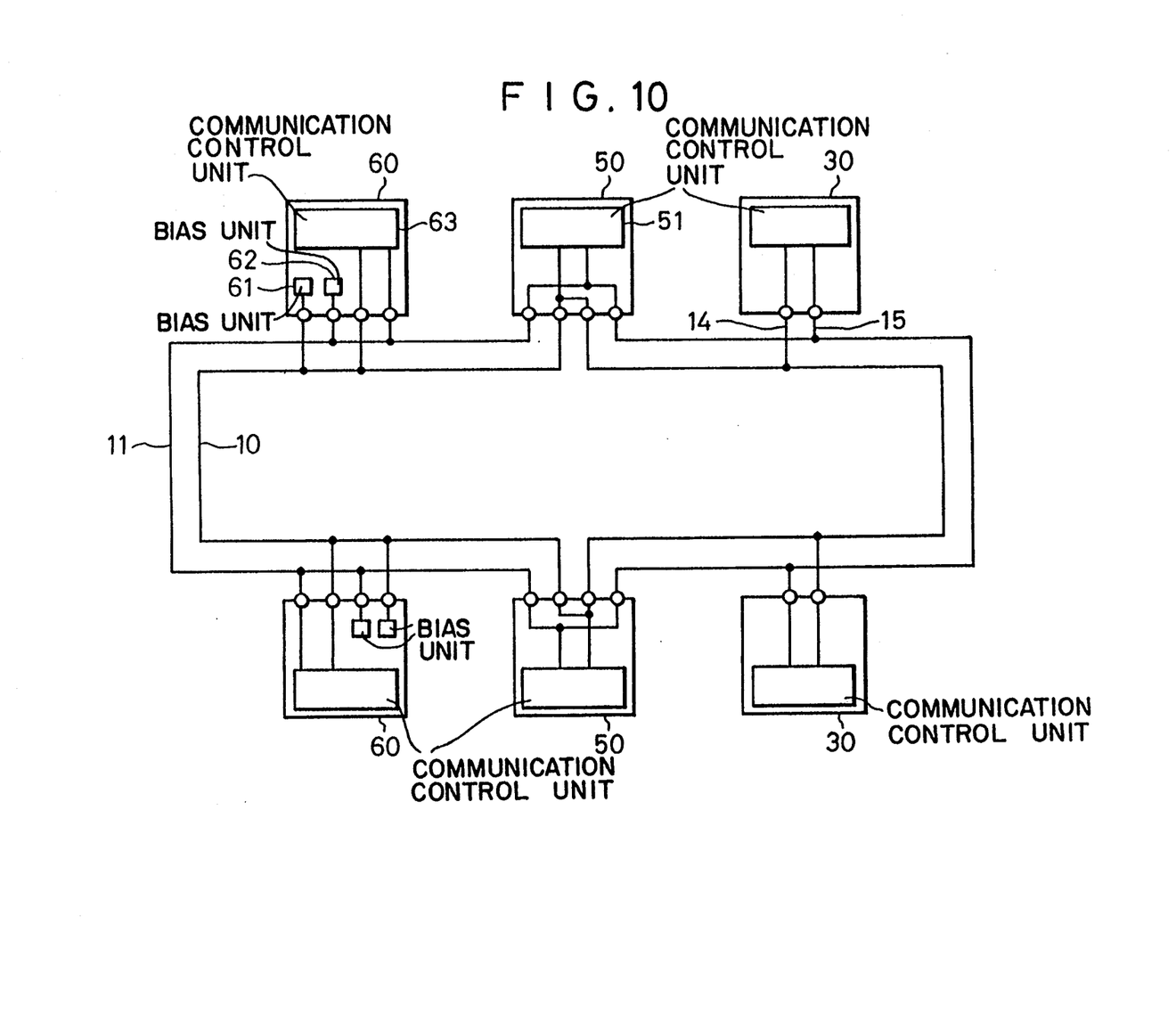
FIG. 10 is a block diagram showing a third embodiment of the arrangement of the multiplex transmission apparatus according to this invention.

FIG. 10 is a diagram showing a third embodiment of the arrangement of the multiplex transmission apparatus according to this invention.

In this drawing, each terminal node 60 (see FIG. 3) including the bias units and each terminal node 30 (node according to the conventional connecting method) including no bias units are connected to each other by means of the two transmission lines 10 and 11, the branch lines 16 to 19, and branch lines 14 and 15, while each terminal node 50 (see FIG. 2) including no bias units is daisy-chain-connected to the two transmission lines 10 and 11. More specifically, in each terminal node 60 including the bias units, both of the bias units 61 and 62 and the communication control unit 63 are connected independently to the transmission lines 10 and 11 by means of the connecting terminals 64 to 67.

Thus, according to this third embodiment, the terminal node 60 can enjoy satisfactory data transfer to and from the other terminal nodes in the apparatus without a double fault even in case of the occurrence of a fault such that one of the branch lines of the terminal node 60 including the bias units is broken.

Figure 11:
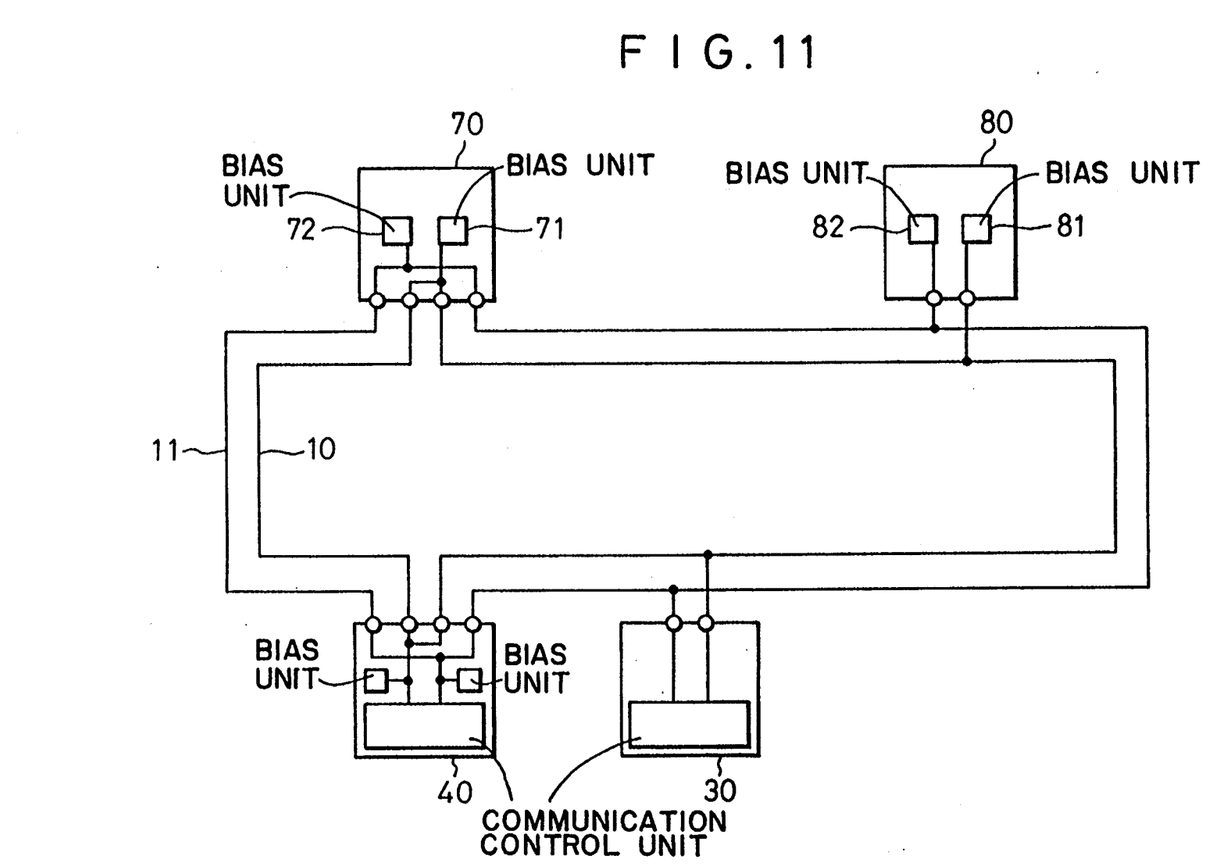
FIG. 11 is a block diagram showing a fourth embodiment of the arrangement of the multiplex transmission apparatus according to this invention.

Although the bias units in each terminal node are connected to the transmission lines according to this third embodiment, the invention is not limited to this arrangement. Referring to FIG. 11 illustrating a fourth embodiment, for example, there is shown an alternative possible arrangement in which first bias units 71 and 81 for biasing the first transmission line 10 to the supply-side potential and second bias units 72 and 82 for biasing the second transmission line 11 to the ground-side potential are arranged independently so that nodes 70 and 80 are formed including the bias units only. In this embodiment, the nodes 70 and 80 may be daisy-chain-connected or connected by means of branch lines, to the two transmission lines 10 and 11, individually.

Figure 12:
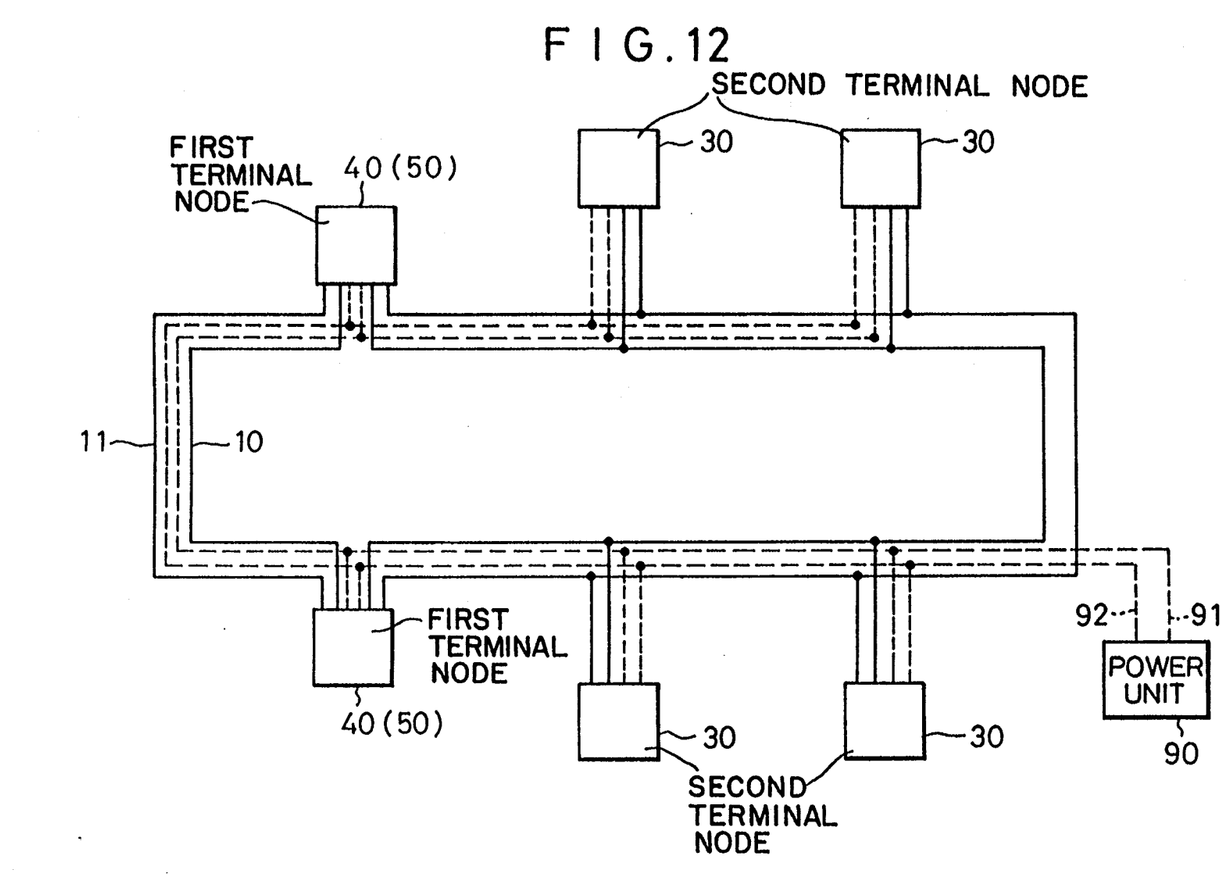
FIG. 12 is a block diagram showing a fifth embodiment of the arrangement of the multiplex transmission apparatus according to this invention.

As in a fifth embodiment shown in FIG. 12, moreover, power lines 91 and 92 for supplying power from a power unit 90 to the terminal nodes 30, 40 and 50 may be arranged along the transmission lines 10 and 11. In this case, a wire-harness configuration can be obtained, and a current loop between the transmission lines and the power lines can be reduced in size. Thus, according to this embodiment, the level of noises emitted from the multiplex transmission apparatus can be lowered, so that influences of the noises on other electronic apparatuses can be reduced.

We claim:

1. A multiplex transmission apparatus comprising:
  at least two transmission lines; and
  a plurality of first and second terminal nodes interconnected by the at least two transmission lines for carrying out multiplex transmission between the plurality of first and second terminal nodes;
  said first terminal nodes each including:
    first biasing means for biasing one of the at least two transmission lines to a power supply potential;
    second biasing means for biasing another of the at least two transmission lines to a ground potential;
    communication control means for modifying respective voltages of the at least two transmission lines when data transmission is carried out, to control data communications; and
    connecting means for connecting each of said first biasing means and said communication control means to said one transmission line at least at two points, and for connecting each of said second biasing means and said communication control means to said another transmission line at least at two points; and
  said second terminal nodes each including communication control means for modifying the respective voltages of the at least two transmission lines when data transmission is carried out, to control data communications.

2. A multiplex transmission apparatus according to claim 1, wherein said second terminal nodes each include connecting means for connecting said communication control means thereof to said transmission lines at least at two points for each of said transmission lines.

3. A multiplex transmission apparatus according to claim 2, wherein said connecting means of each second terminal node connects each of said second terminal nodes to the respective transmission lines by a daisy-chain connection.

4. A multiplex transmission apparatus according to claim 1, wherein said connecting means of each second terminal node connects each of said second terminal nodes to the respective transmission lines by a daisy-chain connection.

5. A multiplex transmission apparatus according to claim 1, wherein said plurality of first and second terminal nodes are connected to power lines for power supply, said power lines being arranged along said at least two transmission lines.

6. A multiplex transmission apparatus according to claim 2, wherein said plurality of first and second terminal nodes are connected to power lines for power supply, said power lines being arranged along said at least two transmission lines.

7. A multiplex transmission apparatus according to claim 3, wherein said plurality of first and second terminal nodes are connected to power lines for power supply, said power lines being arranged along said at least two transmission lines.

8. A multiplex transmission apparatus according to claim 4, wherein said plurality of first and second terminal nodes are connected to power lines for power supply, said power lines being arranged along said at least two transmission lines.

9. A multiplex transmission apparatus comprising:
at least two transmission lines; and
a plurality of first and second terminal nodes interconnected by the at least two transmission lines for carrying out multiplex transmission between the plurality of first and second terminal nodes;
said first terminal nodes each including:
first biasing means for biasing one of the at least two transmission lines to a power supply potential;
second biasing means for biasing another of the at least two transmission lines to a ground potential;
communication control means for modifying respective voltages of the at least two transmission lines when data transmission is carried out, to control data communications; and
connecting means for connecting said first biasing means and said communication control means separately to said one transmission line, and for connecting said second biasing means and said communication control means separately to said another transmission line; and
said second terminal nodes each including communication control means for modifying the respective voltages of the at least two transmission lines when data transmission is carried out, to control data communications.

10. A multiplex transmission apparatus according to claim 9, wherein said second terminal nodes each include connecting means for connecting said communication control means thereof to said transmission lines at least at two points for each of said transmission lines.

11. A multiplex transmission apparatus according to claim 10, wherein said connecting means of each second terminal node connects each of said second terminal nodes to the respective transmission lines by a daisy-chain connection.

12. A multiplex transmission apparatus according to claim 9, wherein said connecting means of each second terminal node connects each of said second terminal nodes to the respective transmission lines by a daisy-chain connection.

13. A multiplex transmission apparatus according to claim 9, wherein said plurality of first and second terminal nodes are connected to power lines for power supply, said power lines being arranged along said at least two transmission lines.

14. A multiplex transmission apparatus according to claim 11, wherein said plurality of first and second terminal nodes are connected to power lines for power supply, said power lines being arranged along said at least two transmission lines.

15. A multiplex transmission apparatus according to claim 12, wherein said plurality of first and second terminal nodes are connected to power lines for power supply, said power lines being arranged along said at least two transmission lines.

16. A multiplex transmission apparatus comprising:
at least two transmission lines; and
a plurality of terminal nodes interconnected by the at least two transmission lines for carrying out data transmission between the terminal nodes;
at least one of said terminal nodes including:
first biasing means for biasing one of the at least two transmission lines to a power supply potential;
second biasing means for biasing another of the at least two transmission lines to a ground potential;
communication control means for modifying respective voltages of the at least two transmission lines when data transmission is carried out, to control data communications; and
connecting means incorporated in said at least one terminal node for connecting each of said first biasing means and said communication control means to said one transmission line at least at two points, and for connecting each of said second biasing means and said communication control means to said another transmission line at least at two points.

17. A multiplex transmission apparatus according to claim 16, wherein said plurality of first and second terminal nodes are connected to power lines for power supply, said power lines being arranged along said at least two transmission lines.

18. A multiplex transmission apparatus comprising:
at least two transmission lines;
a plurality of terminal nodes interconnected by the at least two transmission lines for carrying out data transmission between the terminal nodes;
at least one of said terminal nodes including:
first biasing means for biasing one of the at least two transmission lines to a power supply potential;
second biasing means for biasing another of the at least two transmission lines to a ground potential; and
communication control means for modifying respective voltages of the at least two transmission lines when data transmission is carried out, to control data communications; and
connecting means arranged outside of said at least one terminal node for connecting each of said first biasing means and said communication control means to said one transmission line at least at two points, and for connecting each of said second biasing means and said communication control means to said another transmission line at least at two points.

19. A multiplex transmission apparatus according to claim 18, wherein said plurality of first and second terminal nodes are connected to power lines for power supply, said power lines being arranged along said at least two transmission lines.

20. A multiplex transmission apparatus according to claim 18, wherein said connecting means is arranged in a connector, and wherein said terminal nodes and said at least two transmission lines are connected together by said connector.

* * * * *